(12) United States Patent
Curtis

(10) Patent No.: US 6,668,279 B1
(45) Date of Patent: Dec. 23, 2003

(54) USER LEVEL WEB SERVER IN-KERNEL NETWORK I/O ACCELERATOR

(75) Inventor: Bruce W. Curtis, Sunnyvale, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/513,320

(22) Filed: Feb. 25, 2000

(51) Int. Cl.$^7$ ............................................. G06F 15/16

(52) U.S. Cl. ...................... 709/218; 709/310; 709/316

(58) Field of Search ................................. 709/223–226, 709/227–231, 215–219, 238, 245, 310, 317, 103, 331, 302, 246, 201, 204, 206, 316, 203, 102; 714/39, 35; 703/27; 370/313, 401; 707/10, 100, 104.3, 201; 710/200; 713/188

(56) References Cited

U.S. PATENT DOCUMENTS

| | | | | |
|---|---|---|---|---|
| 5,369,765 A | * | 11/1994 | Collet | |
| 5,659,757 A | * | 8/1997 | Browning et al. | 710/200 |
| 5,819,091 A | * | 10/1998 | Arendt et al. | 709/331 |
| 5,832,222 A | * | 11/1998 | Dziadosz et al. | 709/216 |
| 5,835,724 A | * | 11/1998 | Smith | 709/227 |
| 5,852,717 A | * | 12/1998 | Bhide et al. | 709/203 |
| 5,855,020 A | * | 12/1998 | Kirsch | 707/10 |
| 5,956,484 A | * | 9/1999 | Rosenberg et al. | 709/203 |
| 5,991,802 A | * | 11/1999 | Allard et al. | 709/219 |
| 6,012,090 A | * | 1/2000 | Chung et al. | 709/219 |
| 6,073,212 A | | 6/2000 | Hayes et al. | |
| 6,112,221 A | * | 8/2000 | Bender et al. | 709/102 |
| 6,115,712 A | * | 9/2000 | Islam et al. | 707/10 |
| 6,151,639 A | * | 11/2000 | Tucker et al. | 709/316 |
| 6,163,812 A | * | 12/2000 | Gopal et al. | 709/310 |
| 6,192,398 B1 | | 2/2001 | Hunt | |

(List continued on next page.)

OTHER PUBLICATIONS

A Network of Asynchronous Micro–Servers as a Framework for..—Szmurlo, Madelaine (1997) ; infodoc.unicaen.fr/publications/papiers/PAPER106.ps.gz.*
acsac.dvi ; www.acsac.org/1998/presentations/wed–a–1030–vigna.pdf.*
Protocol Independent Multicast–Sparse Mode.. —Estrin.. (1997) ;ftp.botik.ru/pub/doc/internet–drafts/draft–ietf–idmr–pim–sm–specv2–00.ps.gz.*
Horus: A Flexible Group Communications System—van Renesse, Birman, Maffeis (1996); ftp.cs.cornell.edu/pub/isis/horus/doc/cacm.ps.Z.*
Tripathy, et al, "Web Server In–Kernel Interface to Data Transport System and Cache Manager," U.S. Patent Application No. 09/654,103, Filed Aug. 31, 2000, 36 Pages.
Bruce W. Curtis, "User Level Web Server Cache Control of In–Kernel HTTP Cache," U.S. Application No. 09/513,328, Filed Feb. 25, 2000, 44 Pages.

*Primary Examiner*—Robert B. Harrell
*Assistant Examiner*—Thong Vu
(74) *Attorney, Agent, or Firm*—Beyer Weaver & Thomas LLP

(57) ABSTRACT

Methods and apparatus for transporting data in a web server are disclosed. A HTTP request including HTTP request data is received by a data transport module from a client. The HTTP request data may be sent with a preempt indicator from the data transport module to a HTTP daemon. The preempt indicator indicates whether processing is preempted from the data transport module to the HTTP daemon. Similarly, when a HTTP response is returned from the HTTP daemon to the data transport module, HTTP response data may be sent with a preempt indicator from the HTTP daemon to the data transport module indicating whether processing is preempted from the HTTP daemon to the data transport module. In addition, an identifier identifying the HTTP response data may be returned to the data transport module which identifies the response and enables the data transport module to independently access the response for transmission to a client.

26 Claims, 13 Drawing Sheets

U.S. PATENT DOCUMENTS

| | | | |
|---|---|---|---|
| 6,216,173 B1 * | 4/2001 | Jones et al. | 709/302 |
| 6,223,204 B1 * | 4/2001 | Tucker | 709/103 |
| 6,233,618 B1 * | 5/2001 | Shannon | 709/229 |
| 6,237,040 B1 * | 5/2001 | Tada | 709/246 |
| 6,275,937 B1 * | 8/2001 | Hailpern et al. | 713/188 |
| 6,292,835 B1 | 9/2001 | Huang et al. | |
| 6,411,998 B1 * | 6/2002 | Bryant et al. | 709/224 |
| 6,421,675 B1 * | 7/2002 | Ryan et al. | 707/100 |
| 6,446,113 B1 * | 9/2002 | Oxxie et al. | 709/204 |
| 6,510,439 B1 * | 1/2003 | Rangarajan et al. | 707/201 |
| 6,587,884 B1 * | 7/2003 | Papdopoulos et al. | 709/230 |

* cited by examiner

In-Kernel Cache

| Request Name | Response Data | Advisory State | CTAG | Direct Type |
|---|---|---|---|---|
| URL1 | data 1 | TRUE | 100 | Shmem |
| URL2 | data 2 | FALSE | 832 | File |
| URL3 | data 3 | FALSE | 100 | File |
| URL4 | data 4 | FALSE | 0 | Object |
| URL5 | data 5 | TRUE | 0 | File |

*FIG. 12*

USER LEVEL WEB SERVER IN-KERNEL NETWORK I/O ACCELERATOR

CROSS REFERENCE TO RELATED APPLICATIONS

This invention is related to U.S. patent application Ser. No. 09/513,328, filed on the same day as this patent application, naming Bruce W. Curtis as inventor, and entitled "USER LEVEL WEB SERVER CACHE CONTROL OF IN-KERNEL HTTP CACHE." That application is incorporated herein by reference in its entirety and for all purposes.

BACKGROUND OF THE INVENTION

1. Field of the Invention

The present invention relates generally to computer software. More particularly, the present invention relates to methods and apparatus for enabling a web server to transport data to an in-kernel HTTP cache.

2. Description of Related Art

FIG. 1 is a block diagram illustrating a conventional web server 104. Through the use of a web browser and the web server 104, a user may access a web page on the Internet. In this manner, multiple Hypertext Transfer Protocol (HTTP) clients (e.g., web browsers) 100, 102 may access files via the single web server 104. Typically, a browser user enters HTTP file requests by either "opening" a Web file (e.g., typing in a Uniform Resource Locator or URL) or clicking on a hypertext link. The browser builds a HTTP request and sends it to the Internet Protocol (IP) address indicated by the URL. When the web browser 100 or 102 sends a HTTP request to the web server 104 identified by the IP address, the web server 104 receives the request and, after any necessary processing, the requested file (i.e., HTTP response data) is returned.

Within the web server 104, HTTP requests that are received are processed by a HTTP daemon 105. The HTTP daemon 105 is a program that runs continuously and exists for the purpose of handling HTTP requests. The HTTP daemon 105 forwards the HTTP requests to other programs or processes as appropriate. Thus, each web server has a HTTP daemon 105 that continually waits for requests to come in from Web clients and their users. Once a file (i.e., HTTP response data) is obtained (e.g., from an associated memory 106), the data is transmitted to the client 100 or 102 that requested the data.

HTTP requests are typically initially handled by a kernel 107 that is responsible for forwarding the requests from the client 100 or 102 to the HTTP daemon 105. The kernel 107 is the essential center of a computer operating system, the core that provides basic services for all other parts of the operating system. Typically, a kernel includes an interrupt handler that handles all requests or completed I/O operations that compete for the kernel's services, a scheduler that determines which programs share the kernel's processing time in what order, and a supervisor that actually gives use of the computer to each process when it is scheduled. The kernel 107 may also include a manager of the operating system's address spaces in memory, sharing these among all components and other users of the kernel's services. A kernel's services are requested by other parts of the operating system or by applications through a specified set of program interfaces sometimes known as system calls. The kernel 107 provides services such as buffer management, message routing, and standardized interfaces to protocols which enable data to be routed between a client and a server.

The kernel structure consists of three layers: a socket layer 108, a protocol layer 110, and a device layer 111. The socket layer 108 supplies the interface between the HTTP daemon 105 and lower layers, the protocol layer 110 contains protocol modules for communication, and the device layer 111 contains device drivers that control network devices. Thus, a server and client process may communicate with one another through the socket layer 108.

Conventional Unix network input/output is provided through the use of a file descriptor opened on a socket. A file descriptor is typically an integer that identifies an open file within a process which is obtained as a result of opening the file. In other words, a separate socket is required for each network connection. Thus, as shown, each network connection corresponding to a client has an associated socket layer 112 and protocol layer 114, which may send data via a network interface card 116 via a transmission medium 118 to one or more clients 100, 102. Each socket has its own socket data structure. Since a separate file descriptor is opened on a socket for each network connection, in-kernel resources are unnecessarily consumed. Moreover, there are limits to the number of file descriptors that may be opened at a particular instant in time. In addition, the data types that can be transported by a socket are limited and therefore the speed with which data can be outputted by the web server onto the network is reduced. For instance, a socket typically transports a byte stream. While various "sendfile" mechanisms exist which allow a HTTP daemon to specify a file to be outputted to the network, no mechanism exists which enables a variety of data types to be specified and transported. It is also important to note that in a Unix system, any persistent resources (e.g., file, shared memory segment, in-kernel cached object) which are to be outputted to the network must be copied as a byte-stream via a buffered write thus causing at least one extra copy of the data to occur. Accordingly, the speed with which data is transported onto the network to a client is reduced.

In view of the above, it would be desirable to enable a web server to transport response data associated with a HTTP request to a client with a minimum of memory and processing resources. Moreover, it would be beneficial if input/output between a client and a web server could be accelerated. In addition, it would be preferable if such a system could be implemented on a Unix network.

SUMMARY

An invention is disclosed herein that transports data in a web server. This is accomplished through the use of a data transport module in communication with a HTTP daemon. In this manner, data may be transported effectively between the HTTP daemon and the data transport module as well as to the client requesting the data.

In accordance with one aspect of the invention, a HTTP request including HTTP request data is received by a data transport module from a client. The HTTP request data may be sent with a preempt indicator from the data transport module to a HTTP daemon. The preempt indicator indicates whether processing is preempted from the data transport module to the HTTP daemon. Similarly, when a HTTP response is returned from the HTTP daemon to the data transport module, HTTP response data may be sent with a preempt indicator from the HTTP daemon to the data transport module indicating whether processing is preempted from the HTTP daemon to the data transport module.

In accordance with another aspect of the invention, an identifier identifying the HTTP response data may be returned to the data transport module which identifies the response and enables the data transport module to independently access the response for transmission to a client. In addition, a data type (e.g., shared memory segment, cached response) associated with this directly accessible data may be specified. In this manner, a variety of types of data may be communicated to the data transport module without transporting the data from the HTTP daemon to the data transport module. For instance, the identifier may identify a response stored in an in-kernel cache accessible to the data transport module. Moreover, encapsulation information may be provided to the data transport module indicating whether the response data must be encapsulated prior to transmission to the client and, if so, a method of encapsulation.

BRIEF DESCRIPTION OF THE DRAWINGS

The invention, together with further advantages thereof, may best be understood by reference to the following description taken in conjunction with the accompanying drawings in which:

FIG. 12 is a block diagram illustrating an exemplary in-kernel cache that may be implemented in accordance with an embodiment of the invention.

DETAILED DESCRIPTION OF THE PREFERRED EMBODIMENTS

In the following description, numerous specific details are set forth in order to provide a thorough understanding of the present invention. It will be apparent, however, to one skilled in the art, that the present invention may be practiced without some or all of these specific details. In other instances, well known process steps have not been described in detail in order not to unnecessarily obscure the present invention.

In the following described embodiment, the Solaris Doors API is used to transfer the data and data transport information between the HTTP daemon and the data transport module. However, the invention is not so limited and may be applicable to any appropriate mechanism (e.g., Remote Procedure Call mechanism) for communicating between an application and an in-kernel module. As one example, the data transport information may enable the data to be transported to the client and may include, but is not limited to, an identifier (e.g., location) of the data, the type of data, and encapsulation information that may be used to encapsulate the data prior to being transmitted to the client over the network. As another example, the data transport information may be used to preempt the flow of request and/or response data from the data transport module to the HTTP daemon or from the HTTP daemon to the data transport module. The Solaris™ Doors API is a Remote Procedure Call (RPC) mechanism which makes use of the Unix notion of the filesystem as a universal name space and has built in support for multi-threading. The fundamental building block of this RPC mechanism is the door, which can be thought of as an object upon which a thread can invoke a method. For instance, a "door_call" is used to invoke a method in a server process while a "door_return" is used to return values to the client process. However, the present invention need not be implemented on a Unix system and therefore need not be implemented using one or more doors. The present invention may be implemented on any system which includes an application and a kernel. For instance, the invention may be applicable to a system having a kernel and an application transport protocol layer (e.g., FTP) which is data intensive.

Figure 1:
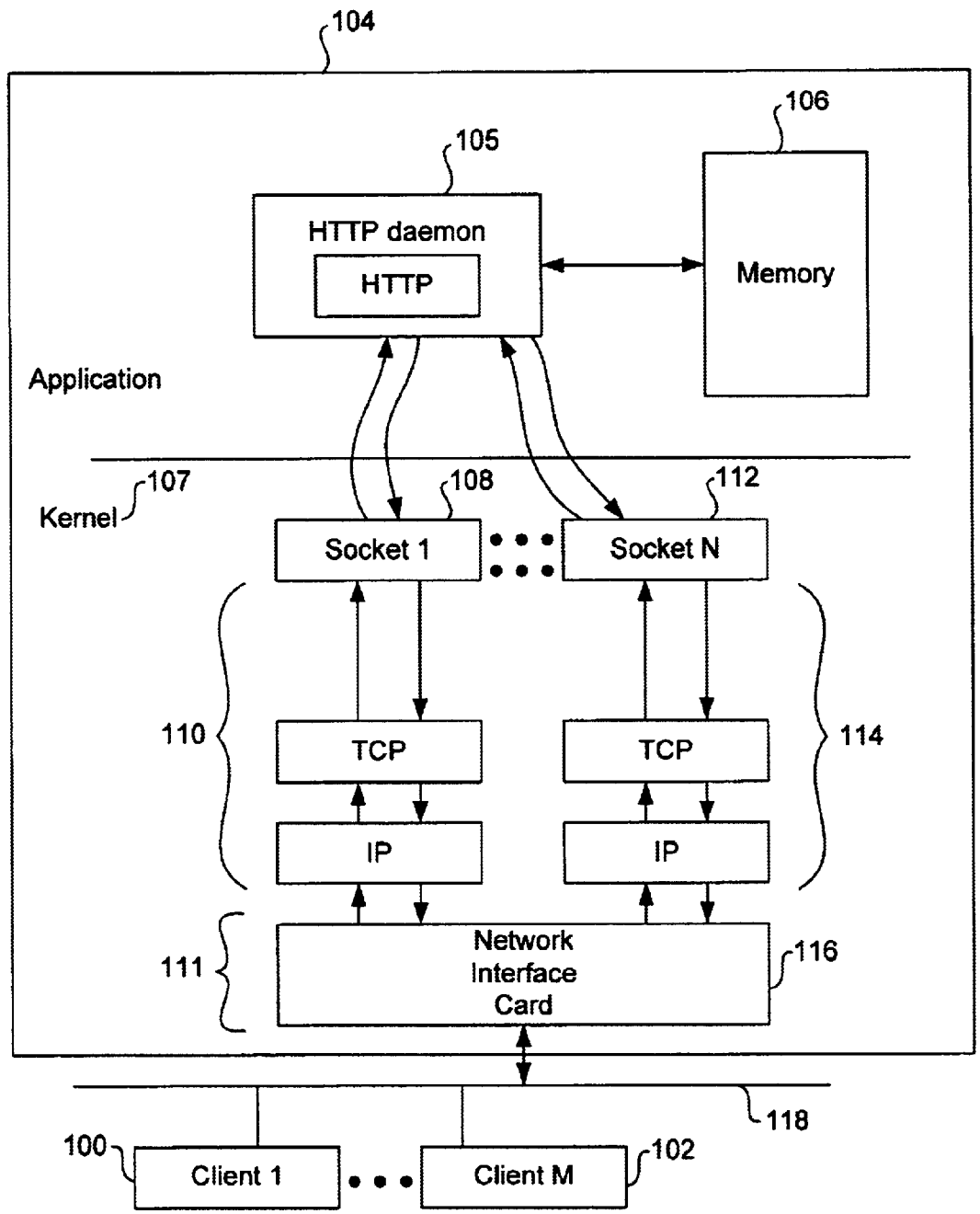
FIG. 1 is a block diagram illustrating a conventional web server.
Figure 2:
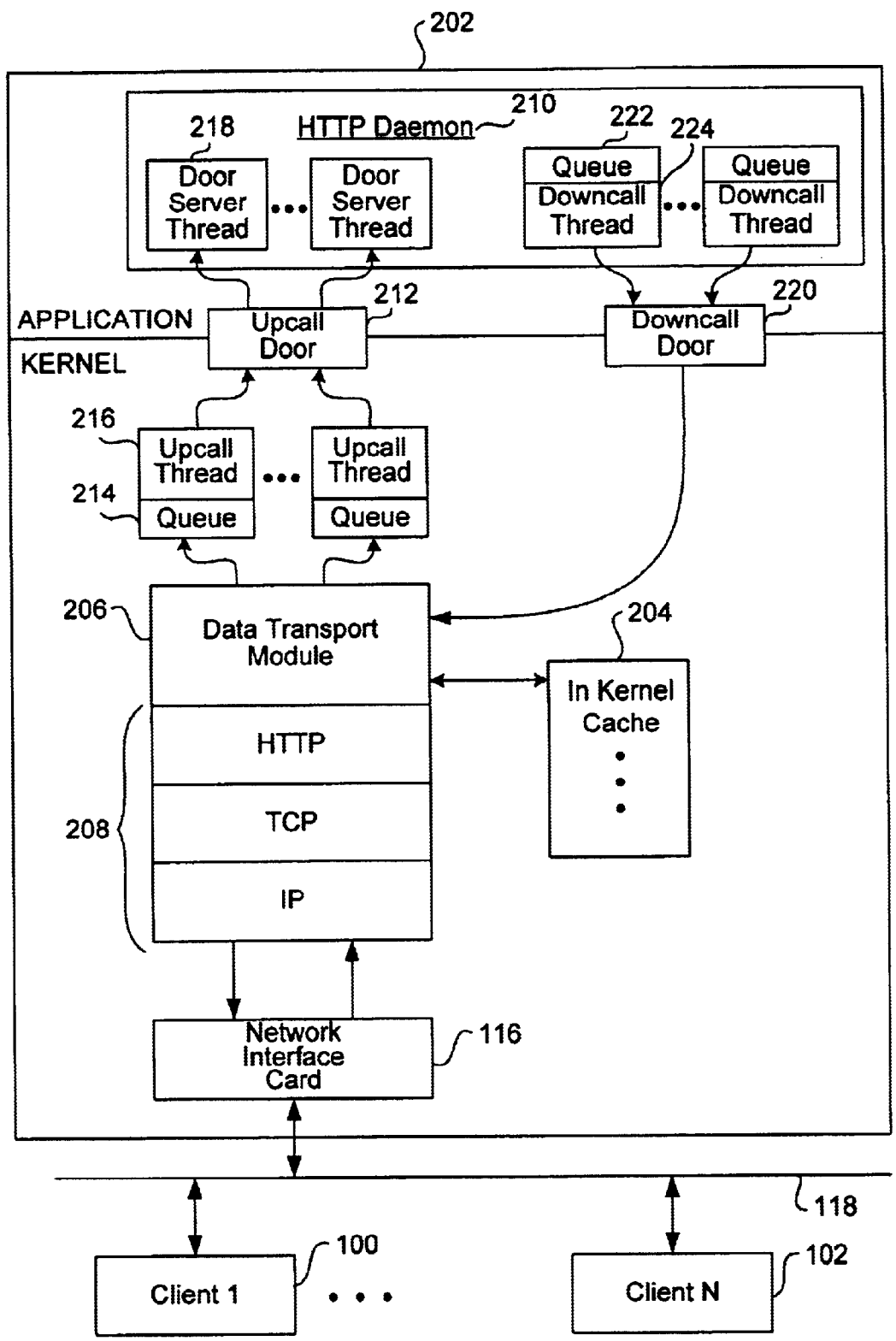
FIG. 2 is a block diagram illustrating a system in which a data transport module is implemented in accordance with an embodiment of the invention.

FIG. 2 is a block diagram illustrating a system in which an in-kernel data transport module is implemented in accordance with an embodiment of the invention. As shown in FIG. 2, multiple clients 100, 102 may send HTTP requests to a web server 202. Within the web server, an in-kernel cache 204 is managed by a data transport module 206 having an associated protocol stack 208. The data transport module 206 routes HTTP requests or portions thereof (and/or other information or requests) to a HTTP daemon 210 via an upcall door 212. More particularly, the data transport module places an object (e.g., containing the HTTP request and/or other requests or information) in an upcall thread queue 214. An upcall thread 216 then obtains the HTTP request from the upcall thread queue and invokes a method implemented by the HTTP daemon 210 as a door server thread 218. The HTTP daemon 210 may return a HTTP response (or portion thereof) and/or directives to control information that is stored in the in-kernel cache 204 or control the flow of information that is transmitted to a client 100 or 102. This information is sent to the data transport module 206 via a downcall door 220. More particularly, the HTTP daemon 210 places an object containing the HTTP response and/or directives in a downcall thread queue 222. The object is later obtained from the downcall thread queue 222 by an associated downcall thread 224. The downcall thread 224 then sends this object to the data transport module 206 via the downcall door 220. The data transport module 206 may then obtain the HTTP response and/or directives from the object received via the downcall door 220 so that it may determine how to manage the transmission and/or storage of response data received from the HTTP daemon 210. In this manner, the HTTP daemon 210 may manage the flow of information between the HTTP daemon 210 and the data transport module 206 as well as control information that is transmitted to the clients 100 and 102.

Figure 3:
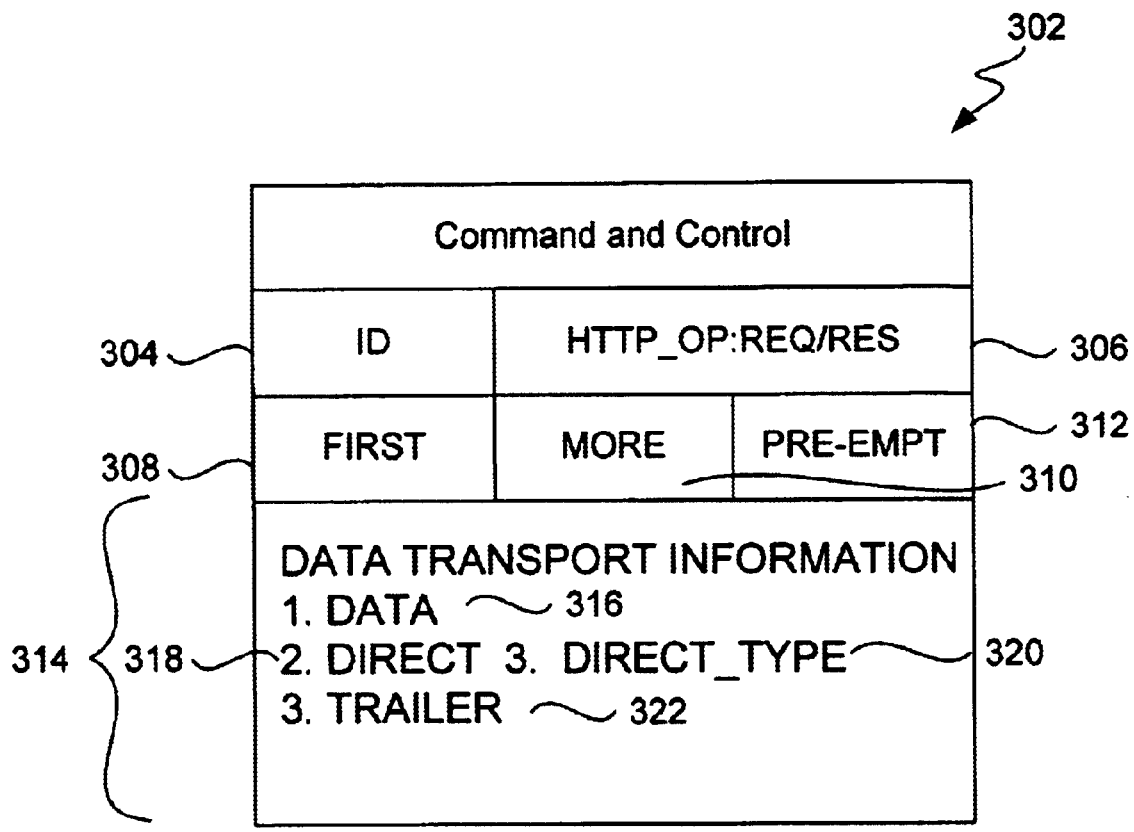
FIG. 3 is a block diagram illustrating a data type that may be transported in accordance with an embodiment of the invention.

As described above with reference to FIG. 2, the data transport module 206 and the HTTP daemon 210 communicate through sending an object. FIG. 3 is a block diagram illustrating an exemplary data type that may be transported in accordance with an embodiment of the invention. More particularly, in accordance with one embodiment, the data transport module 206 and the HTTP daemon 210 both transmit a HTTP request-response object. The information that may be provided in the HTTP request-response object is illustrated generally in FIG. 3. A HTTP request-response object 302 is shown to identify the data stream (e.g., through an identifier ID) 304 between the data transport module and the HTTP daemon. In addition, the HTTP request-response object 302 may transmit either a HTTP request or a HTTP response. More particularly, a HTTP_OP field 306 indicates whether the object is transmitting request or response data. In addition, the HTTP_OP field 306 may also indicate that an error message is being transmitted. A FIRST field 308 indicates whether this is the first block of data in a set of request or response data. A MORE field 310 indicates whether more request or response data is to follow for the associated HTTP request or response, respectively.

The HTTP request-response object 302 also transmits information that can modify the flow of data between the data transport module and the HTTP daemon as well as the flow of data to the client. A PREEMPT field 312 may be set to preempt data flow from the data transport module to the HTTP daemon (i.e., to the downcall door) as well as to preempt data flow from the HTTP daemon to the data transport module (i.e., to the upcall door). In addition, data transport information 314 may specify HTTP request data or HTTP response data that is to be transmitted to the client in accordance with the HTTP_OP field 306. More particularly, the data transport information 314 may include HTTP request/response DATA 316 (e.g., byte stream), a DIRECT field 318 that identifies data (e.g., file, shared memory segment, previously cached object) that is directly accessible by the data transport module. Thus, this data need not be transported by the object from the HTTP daemon to the data transport module. In addition, the DIRECT TYPE 320 (e.g., file, shared memory segment, previously cached object) of the directly accessible data 318 may be specified in order to enable the data to be subsequently accessed by the data transport module. Finally, a TRAILER 322 field may be used to include encapsulation information such as whether the response needs to be encapsulated prior to being transmitted to the client or indicate a method of encapsulation.

As described above with reference to FIG. 3, in one embodiment, the data transport module and the HTTP daemon exchange information through sending a HTTP request-response object in which the information is provided. Although the data transport module and HTTP daemon transmit the same type of object (e.g., HTTP request-response object), the data transport module and the HTTP daemon may transmit the information in a variety of formats. Accordingly, the HTTP request-response object is merely illustrative and other mechanisms for storing and transmitting data between the data transport module and the HTTP daemon are contemplated.

Through the use of the present invention, the transmission of data in response to a HTTP request is accelerated. This is accomplished, in part, through enabling efficient use of resources such as the CPU (e.g., threads) through preemption. More particularly, the data transport module and the HTTP daemon may each preempt one another (e.g., defer processing) while waiting for necessary resources (e.g., data) to continue processing. In addition, transmission of the data is accelerated since the data may be identified by the HTTP daemon for retrieval by the data transport module, thereby eliminating the need for the HTTP daemon to transport this data to the data transport module.

Figure 4:
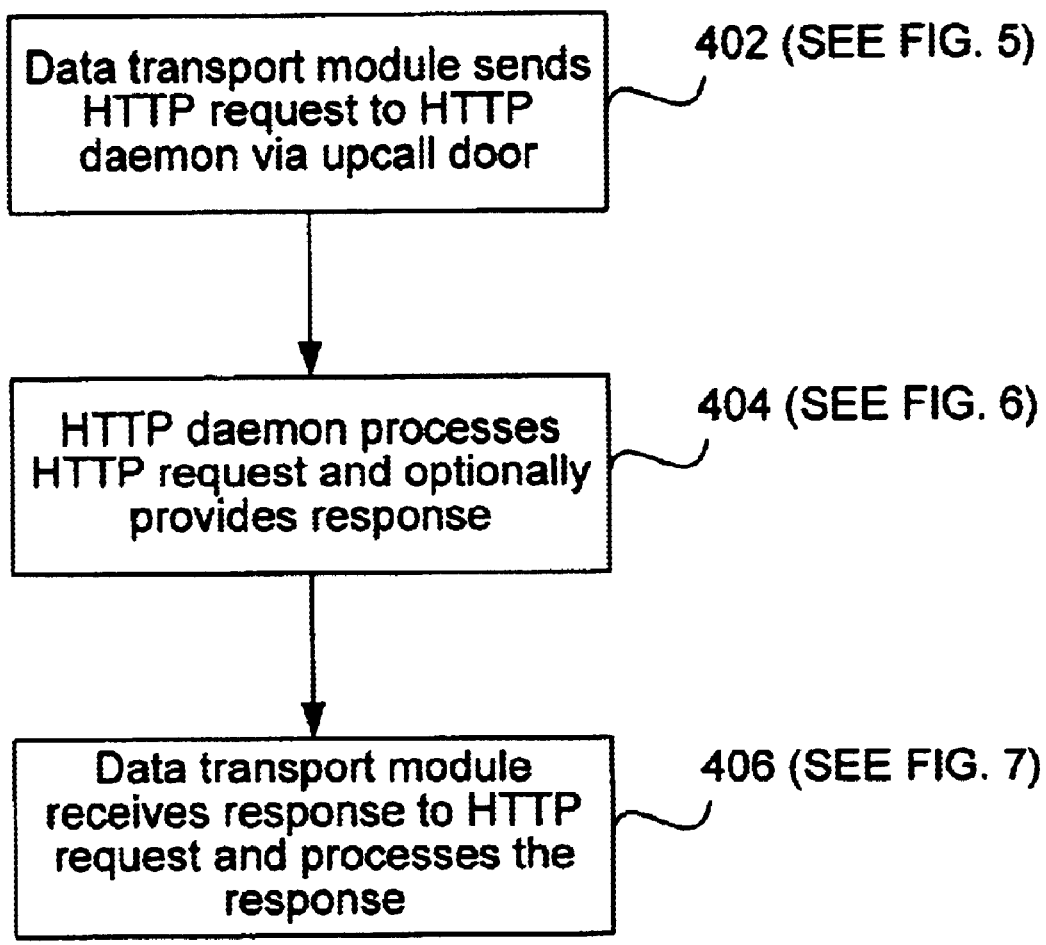
FIG. 4 is a process flow diagram illustrating a method of processing a HTTP request received from a client in accordance with an embodiment of the invention.

FIG. 4 is a process flow diagram illustrating a method of processing a HTTP request received from a client in accordance with an embodiment of the invention. The data transport module sends a HTTP request received from a client to a HTTP daemon via an upcall door at block 402. One method of sending the HTTP request to the HTTP daemon will be described in further detail with reference to FIG. 5. Once the HTTP daemon receives the HTTP request, it processes the request and optionally provides a response in the HTTP request-response object as shown at block 404. One method of processing the HTTP request and providing a response as implemented by the HTTP daemon will be described in further detail below with reference to FIG. 6. The data transport module then receives the response to the HTTP request and processes the response as shown at block 406. One method of processing the response to the HTTP request by the data transport module will be described in further detail below with reference to FIG. 7.

Figure 5:
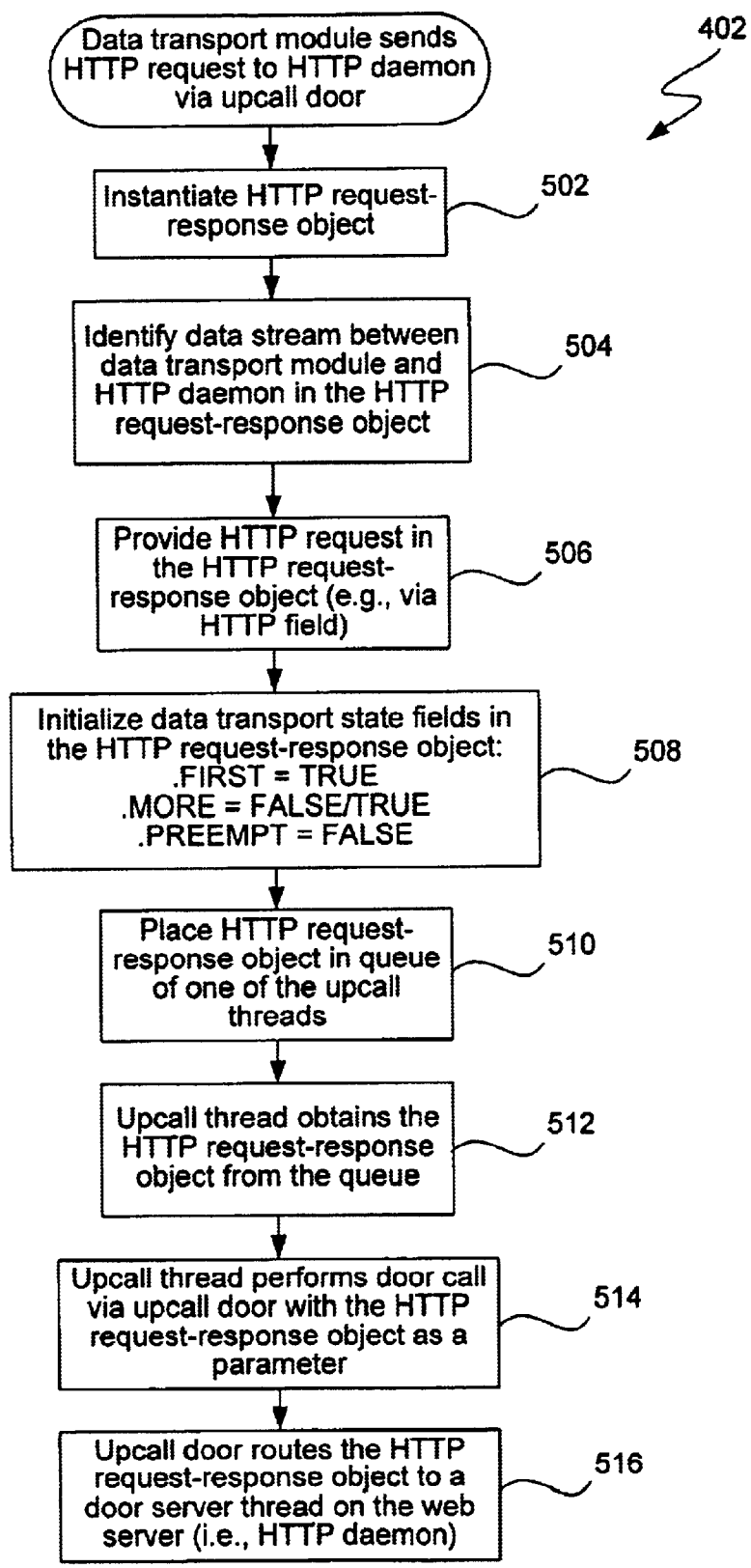
FIG. 5 is a process flow diagram illustrating a method of sending a HTTP request to a HTTP daemon as shown at block 402 of FIG. 4.

When the data transport module sends a HTTP request received from a client to the HTTP daemon, the data transport module may wish to preempt further processing to the HTTP daemon for a period of time or until the data transport module wishes to resume processing. FIG. 5 is a process flow diagram illustrating a method of sending a HTTP request to a HTTP daemon as shown at block 402 of FIG. 4. The data transport module instantiates a HTTP request-response object at block 502 and identifies the data stream between the data transport module and the HTTP daemon (e.g., via an ID in the request-response object) at block 504. The HTTP request is then provided in the HTTP request-response object at block 506 (e.g., by setting the HTTP_OP field and providing HTTP data in the data field). The data transport module then initializes the data transport fields in the object at block 508. For instance, the data transport module sets the FIRST field to indicate that this is the first request data portion of the HTTP request being sent and sets the MORE field to indicate whether further HTTP request data associated with the HTTP request is to follow. In addition, the PREEMPT field may be set to preempt the data flow to the downcall door (i.e., from the data transport module to the HTTP daemon). For instance, the data transport module may wish to defer processing until resources are available to enable the data transport module to send remaining HTTP request data associated with the HTTP request to the HTTP daemon. Thus, when data flow is preempted, the MORE indicator may also be set to indicate that the HTTP request comprises further request data to be sent to the HTTP daemon. Accordingly, when data flow is preempted to the HTTP daemon, processing is preempted from the upcall door to the downcall door.

Once the fields of the HTTP request-response object are initialized, the HTTP request-response object is placed in a queue of one of the upcall threads at block 510. The upcall thread subsequently obtains the HTTP request-response object from the queue at block 512 and performs a door call via the upcall door with the HTTP request-response object as a parameter at block 514. The upcall door then routes the HTTP request-response object to a door server thread on the web server (i.e., HTTP daemon) at block 516.

Figure 6:
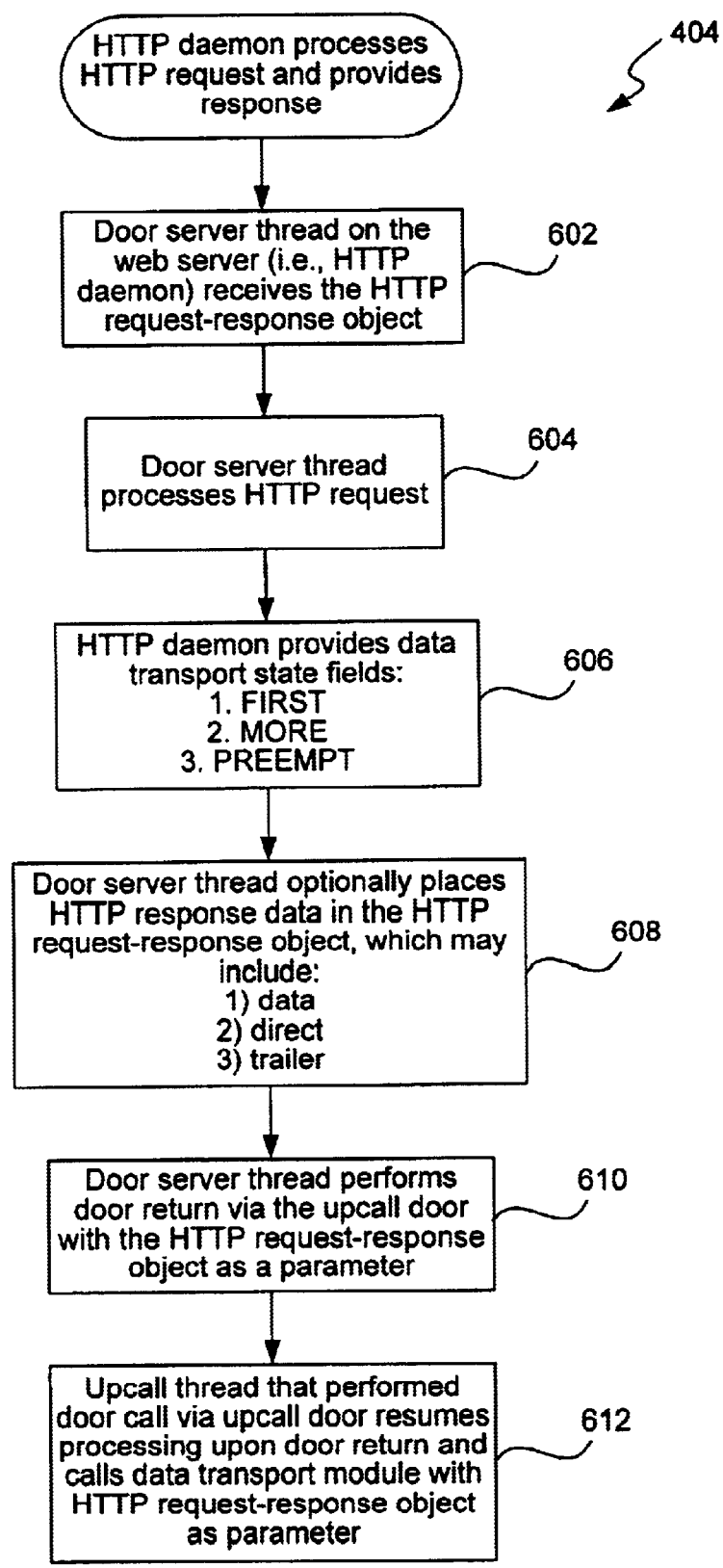
FIG. 6 is a process flow diagram illustrating a method of processing a HTTP request and providing a response as shown at block 404 of FIG. 4.

When the HTTP daemon receives the HTTP request, it may provide data in the HTTP request-response object as well as indicate that it wishes to preempt the processing flow to the data transport module. FIG. 6 is a process flow diagram illustrating a method of processing a HTTP request and providing a response as shown at block 404 of FIG. 4. The door server thread on the web server (i.e., HTTP daemon) receives the HTTP request-response object at block 602 and the door server thread processes the HTTP request to obtain response data associated with the HTTP request at block 604. The HTTP daemon then sets the FIRST, MORE, and PREEMPT fields as appropriate at block 606. More particularly, the FIRST field is set when this is the first response data block associated with the HTTP response. Similarly, the MORE field is set if further response data is to be returned by the HTTP daemon. In addition, the PREEMPT field may be set to indicate that processing is to be preempted from the HTTP daemon to the data transport module while the HTTP defers processing. For instance, when further response data is to be obtained, the HTTP daemon may wish to defer processing until resources are available to enable the HTTP daemon to ascertain and obtain the HTTP response associated with the HTTP request and send an object identifying (and/or including) the HTTP response to the in-kernel data transport module. When this occurs, processing is preempted from the downcall door to the upcall door. Thus, in accordance with one embodiment, when further response data is to be transmitted to the in-kernel data transport module via the downcall door, the MORE bit and the PREEMPT bit are both set.

The HTTP daemon (i.e., door server thread) may optionally place HTTP response data in the HTTP request-response data at block 608. This response data may include response data in the DATA field that must be transported in the object. Alternatively, the response data may be directly identified in the DIRECT field that identifies data that is directly accessible by the data transport module. Since the in-kernel cache is preferably mutually accessible by the HTTP daemon and the data transport module/cache manager, the HTTP daemon may track and identify information that has been returned to the data transport module (e.g., via a CTAG identifying an in-kernel cached object). For instance, the DIRECT field may identify a file, a shared memory segment, or response previously returned by the HTTP daemon and stored in an in-kernel cache that may be independently accessed by the data transport module. Thus, this data need not be transported in the object by the HTTP daemon to the data transport module. Moreover, a DIRECT TYPE may be provided in the object to specify the data type of the DIRECT data, thereby enabling the data transport module to access the data. In addition, the TRAILER field may provide encapsulation information such as whether the data (e.g., provided in the DIRECT field) must be encapsulated and if so, what method of encapsulation, prior to transmitting the response data to the client. The door server thread then performs a door return via the upcall door with the HTTP request-response object as a parameter at block 610. The upcall thread that performed the door call via the upcall door then resumes processing upon the door return and calls the data transport module with the HTTP request-response object as a parameter at block 612.

Figure 7:
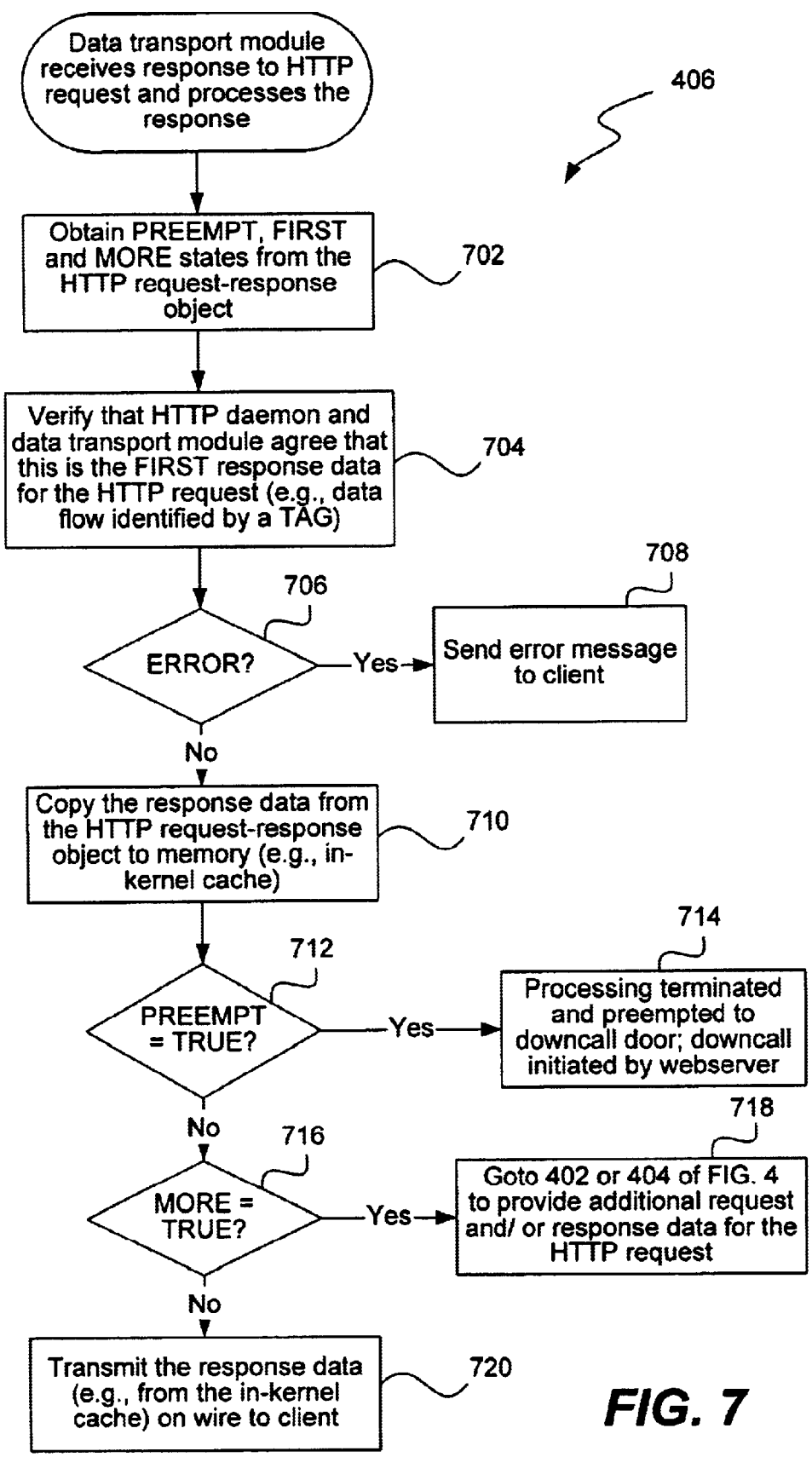
FIG. 7 is a process flow diagram illustrating a method of processing a response received by the data transport module as shown at block 406 of FIG. 4.

When the data transport module receives the response to the HTTP request from the HTTP daemon, it may determine whether the HTTP daemon has preempted the flow to the HTTP daemon. FIG. 7 is a process flow diagram illustrating a method of processing a response received by the data transport module as shown at block 406 of FIG. 4. The data transport module obtains the PREEMPT, FIRST and MORE states from the HTTP request-response object at block 702. The data transport module then verifies that the HTTP daemon and the data transport module are in agreement that this is the first response data for the HTTP request at block 704. At block 706, the data transport module determines whether there is an error (e.g., whether this is not the first response data). If there is an error, an error message is sent to the client at block 708. Otherwise, the response data is copied from the HTTP request-response object to memory (e.g., in-kernel cache) at block 710. At block 712 if the data transport module determines that the PREEMPT state is set, processing is terminated and preempted to the downcall door at block 714 as dictated by the HTTP daemon. The downcall is subsequently initiated by the HTTP daemon. If the data transport module determines that the MORE state is set at block 716, processing continues at block 402 or 404 of FIG. 4 as shown at block 718 to provide additional request and/or response data for the HTTP request. If there is no more response data associated with the HTTP request to receive from the HTTP daemon, the obtained response data is transmitted (e.g., from the in-kernel cache) on the transmission medium to the client at block 720.

Figure 8:
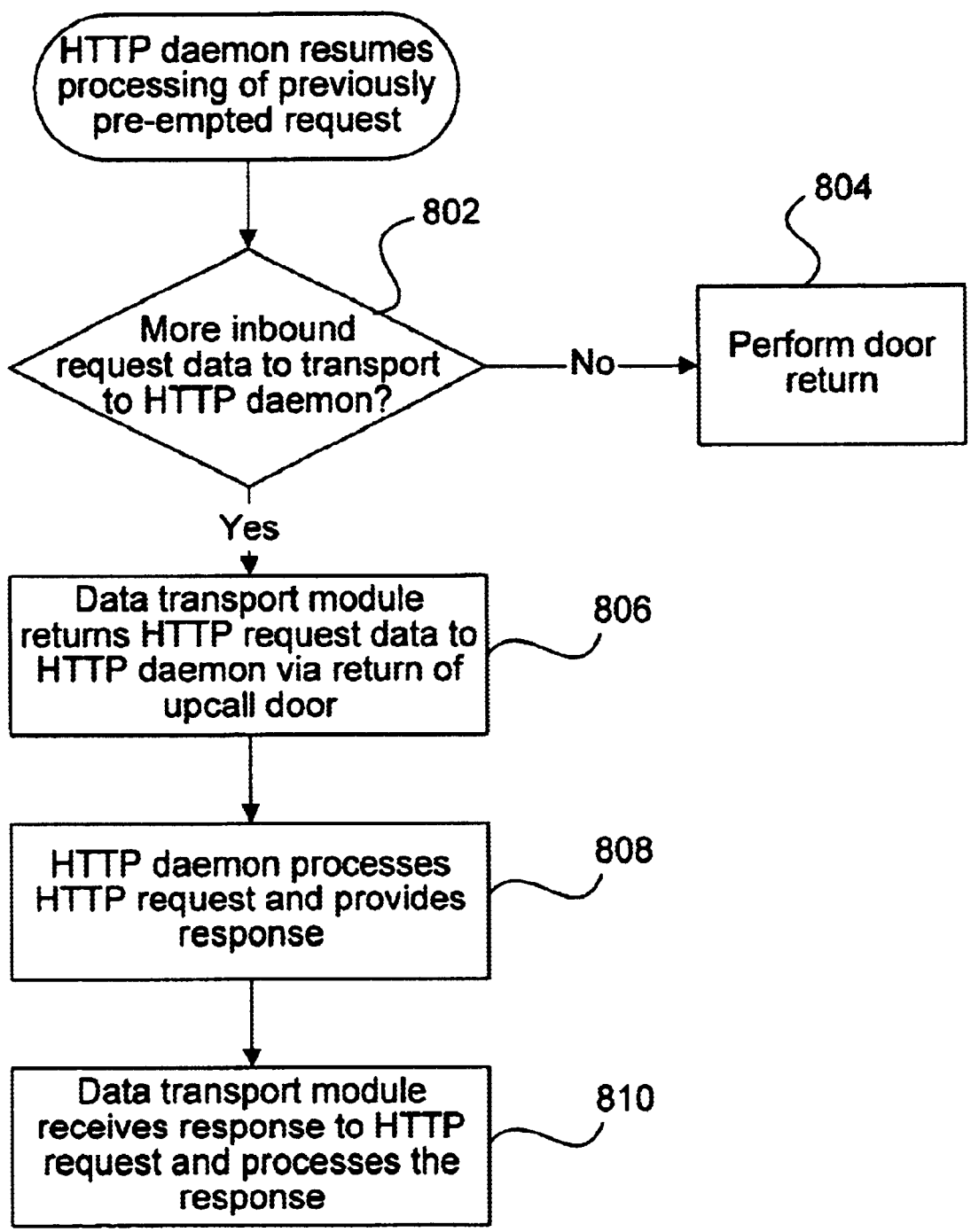
FIG. 8 is a process flow diagram illustrating a method of resuming processing by a HTTP daemon of a previously preempted request in accordance with an embodiment of the invention.

FIG. 8 is a process flow diagram illustrating a method of resuming processing by a HTTP daemon of a previously preempted request in accordance with an embodiment of the invention. If it is determined at block 802 that there is no more inbound request data to transport to the HTTP daemon, the data transport module performs a door return at block 804. Otherwise, the data transport module returns HTTP request data to the HTTP daemon via return of the upcall door at block 806. The HTTP daemon processes the HTTP request and optionally provides a response at block 808. The data transport module receives the response to the HTTP request and processes the response at block 810.

Figure 9:
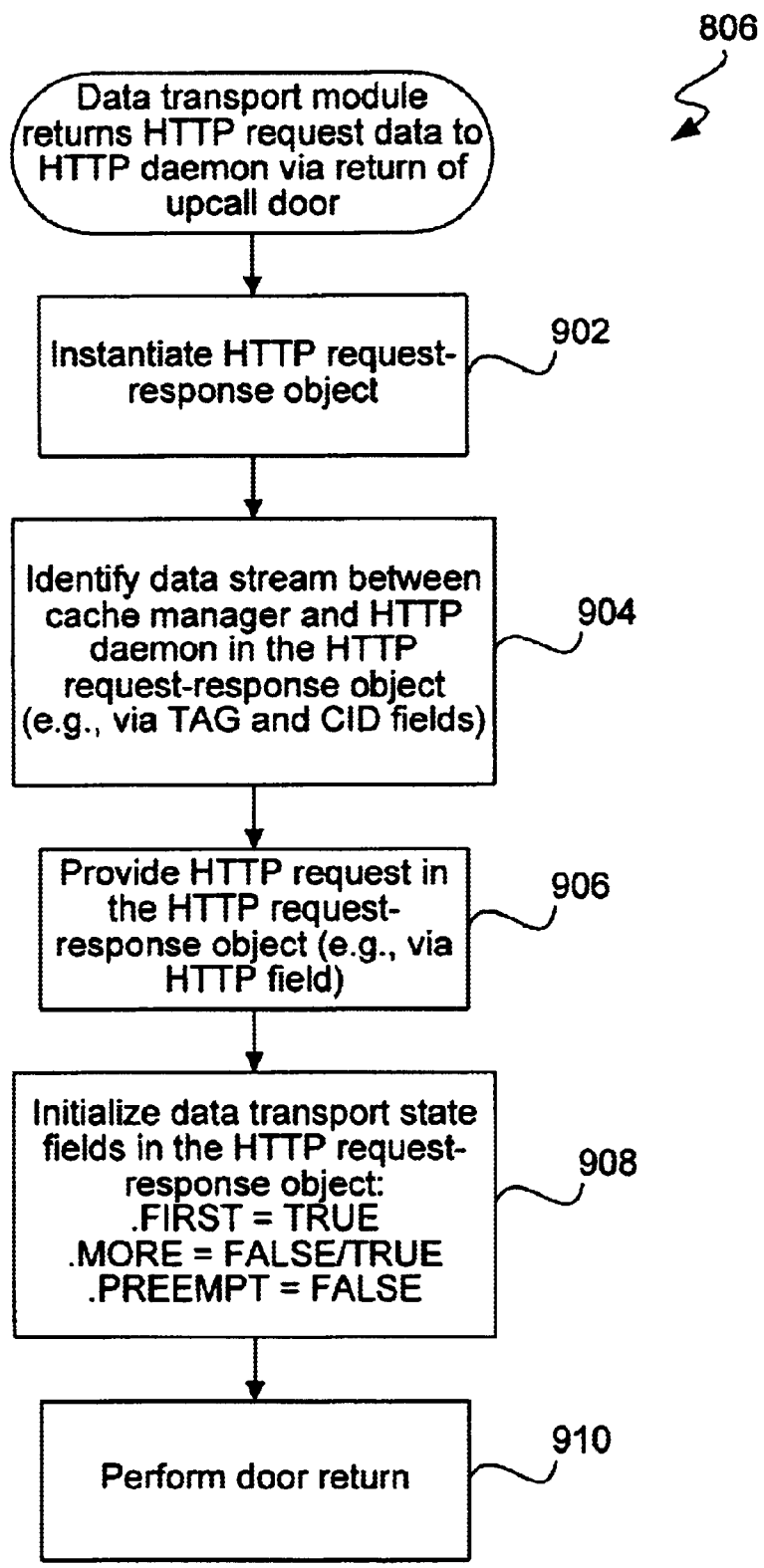
FIG. 9 is a process flow diagram illustrating a method of returning HTTP request data to the HTTP daemon as shown at block 806 of FIG. 8.

When the downcall is performed by the HTTP daemon (independently or in response to an upcall), the data transport module may return additional request data to the HTTP daemon via a return of the upcall door. FIG. 9 is a process flow diagram illustrating a method of returning HTTP request data to the HTTP daemon as shown at block 806 of FIG. 8. The data transport module instantiates a HTTP request-response object at block 902 and identifies the data stream between the data transport module and the HTTP daemon (e.g., via an ID in the request-response object) at block 904. The HTTP request is then provided in the HTTP request-response object at block 906 (e.g., by setting the HTTP_OP field and providing HTTP data in the data field). The data transport module then initializes the data transport fields in the object at block 908. For instance, the data transport module sets the FIRST field to indicate that this is the first request data portion of the HTTP request being sent and sets the MORE field to indicate whether further HTTP request data associated with the HTTP request is to follow. In addition, the PREEMPT field may be set to preempt the data flow to the downcall door (i.e., from the data transport module to the HTTP daemon). For instance, the data transport module may wish to defer processing until resources are available to enable the data transport module to send remaining HTTP request data associated with the HTTP request to the HTTP daemon. Thus, when data flow is preempted, the MORE indicator may also be set to indicate that the HTTP request comprises further request data to be sent to the HTTP daemon. Accordingly, when data flow is preempted to the HTTP daemon, processing is preempted from the upcall door to the downcall door. A door return is then performed at block 910.

Figure 10:
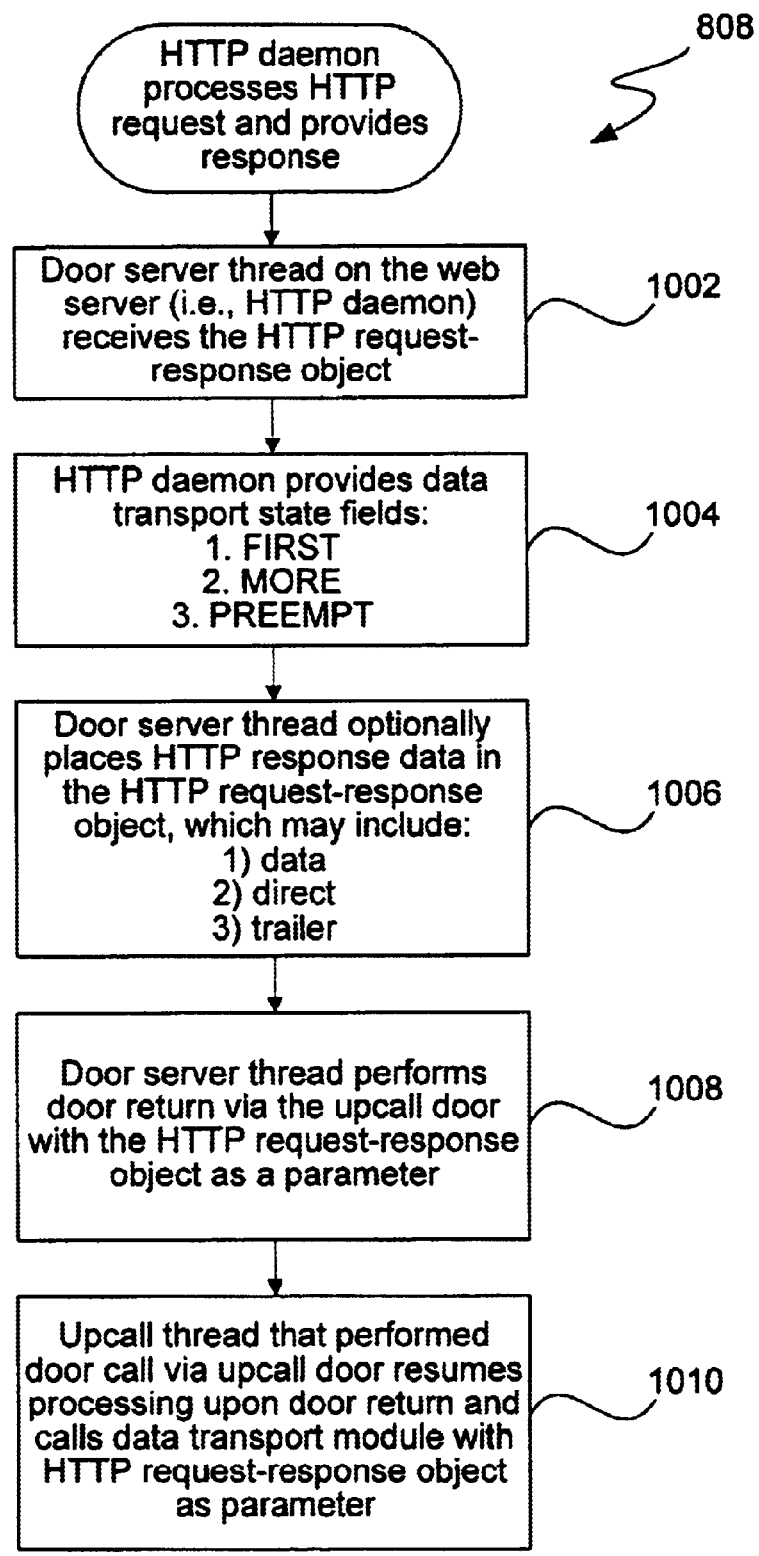
FIG. 10 is a process flow diagram illustrating a method of processing the HTTP request and providing a response as shown at block 808 of FIG. 8.

The HTTP daemon resumes processing of the previously preempted request and provides a response. FIG. 10 is a process flow diagram illustrating a method of processing the HTTP request and providing a response as shown at block 808 of FIG. 8. The door server thread on the web server (i.e., HTTP daemon) receives the HTTP request-response object at block 1002. The HTTP daemon then sets the FIRST, MORE, and PREEMPT fields as appropriate at block 1004. More particularly, the FIRST field is set when this is the first response data block associated with the HTTP response. Similarly, the MORE field is set if further response data is to be returned by the HTTP daemon. In addition, the PREEMPT field may be set to indicate that processing is to be preempted from the HTTP daemon to the data transport module while the HTTP defers processing. For instance, when further response data is to be obtained, the HTTP daemon may wish to defer processing until resources are available to enable the HTTP daemon to ascertain and obtain the HTTP response associated with the HTTP request and send an object identifying (and/or including) the HTTP response to the in-kernel data transport module. When this occurs, processing is preempted from the downcall door to the upcall door. Thus, in accordance with one embodiment, when further response data is to be transmitted to the in-kernel data transport module via the downcall door, the MORE bit and the PREEMPT bit are both set.

The HTTP daemon (i.e., door server thread) may optionally place HTTP response data in the HTTP request-response data at block 1006. This response data may include response data in the DATA field that must be transported in the object. Alternatively, the response data may be directly identified in the DIRECT field that identifies data that is directly accessible by the data transport module. For instance, the DIRECT field may identify a file, a shared memory segment, or response previously returned by the HTTP daemon and stored in an in-kernel cache that may be independently accessed by the data transport module. Thus, this data need not be transported in the object by the HTTP daemon to the data transport module. Moreover, a DIRECT TYPE may be provided in the object to specify the data type of the DIRECT data, thereby enabling the data transport module to access the data. In addition, the TRAILER field may provide encapsulation information such as whether the data (e.g., provided in the DIRECT field) must be encapsulated and if so, what method of encapsulation, prior to transmitting the response data to the client. The door server thread then performs a door return via the upcall door with the HTTP request-response object as a parameter at block 1008. The upcall thread that performed the door call via the upcall door then resumes processing upon the door return and calls the data transport module with the HTTP request-response object as a parameter at block 1010.

Figure 11:
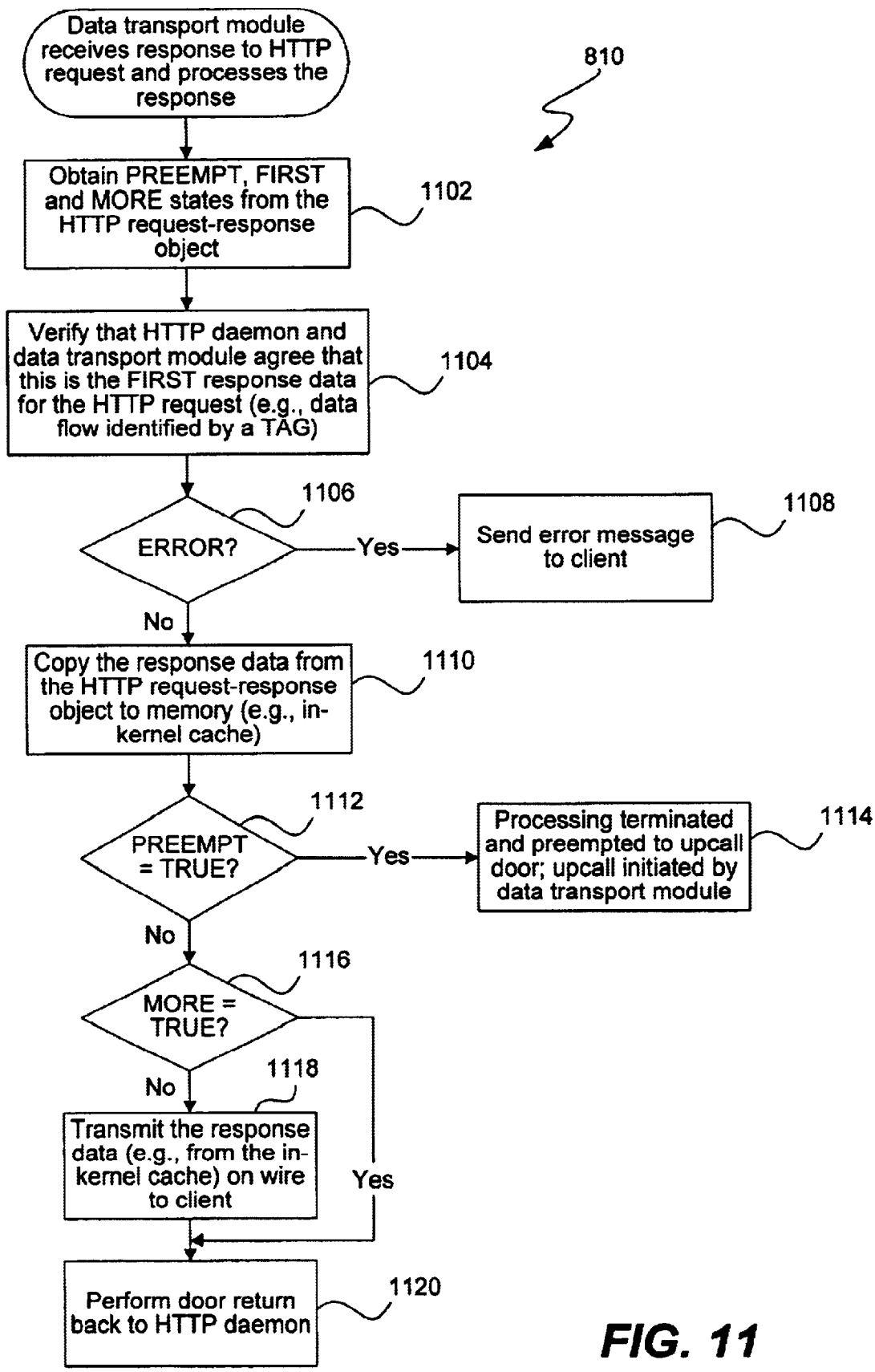
FIG. 11 is a process flow diagram illustrating a method of processing a HTTP response received from the HTTP daemon as shown at block 810 of FIG. 8.

FIG. 11 is a process flow diagram illustrating a method of processing a HTTP response received from the HTTP daemon as shown at block 810 of FIG. 8. The data transport module obtains the PREEMPT, FIRST and MORE states from the HTTP request-response object at block 1102. The data transport module then verifies that the HTTP daemon and the data transport module are in agreement that this is the first response data for the HTTP request at block 1104. At block 1106, the data transport module determines whether there is an error (e.g., whether this is not the first response data). If there is an error, an error message is sent to the client at block 1108. Otherwise, the response data is copied from the HTTP request-response object to memory (e.g., in-kernel cache) at block 1110. At block 1112 if the data transport module determines that the PREEMPT state is set, processing is terminated and preempted to the downcall door at block 1114 as dictated by the HTTP daemon. The downcall is subsequently initiated by the HTTP daemon. The data transport module then determines whether the MORE state is set at block 1116. If there is no more response data associated with the HTTP request to receive from the HTTP daemon, the obtained response data is transmitted (e.g., from the in-kernel cache) on the transmission medium to the client at block 1118. The data transport module then performs a door return at block 1120.

FIG. 12 is a block diagram illustrating an exemplary in-kernel cache that may be implemented in accordance with an embodiment of the invention. As shown, the in-kernel cache may store a plurality of entries associated with multiple HTTP requests. Each entry may specify a HTTP request name 1302 specified by the HTTP request, response data 1304, an advisory state 1306 indicating whether the data transport module (or cache manager) must obtain permission prior to transmitting the associated cached response data, and a CTAG identifier 1308 unique to the HTTP response data. As shown, the CTAG identifier 1308 may identify a response object (e.g., stored in secondary storage). In addition, the cache may further include a direct type 1310 of the DIRECT response data. For instance, as described above, the direct type 1310 of the DIRECT response data may be a shared memory segment, a file, or a previously cached object. In this manner, the response data may be cached with reduced memory consumption.

Figure 13:
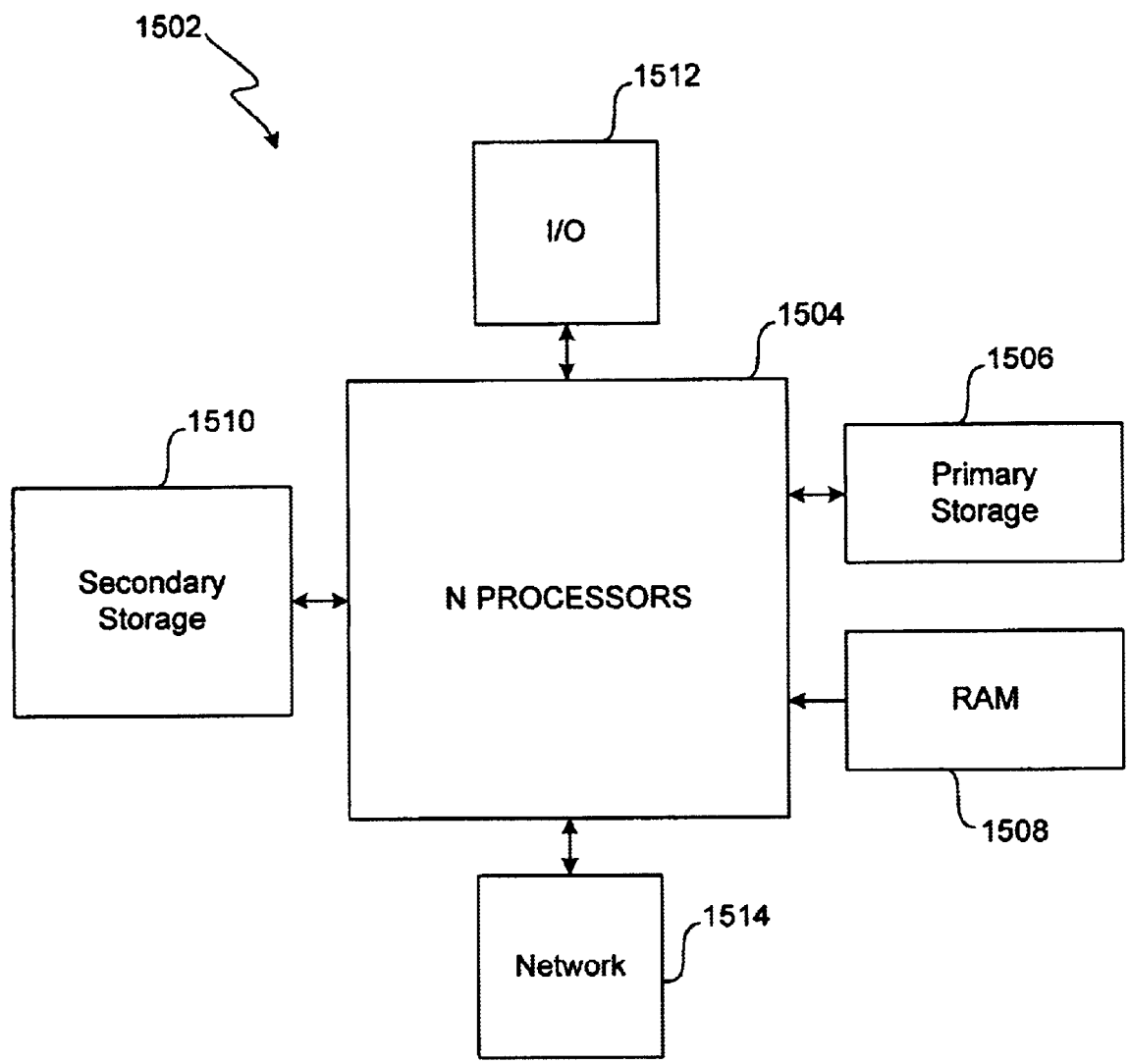
FIG. 13 is a block diagram illustrating a typical, general-purpose computer system suitable for implementing the present invention.

The present invention may be implemented on any suitable computer system. FIG. 13 illustrates a typical, general-purpose computer system 1502 suitable for implementing the present invention. The computer system may take any suitable form.

Computer system 1530 or, more specifically, CPUs 1532, may be arranged to support a virtual machine, as will be appreciated by those skilled in the art. The computer system 1502 includes any number of processors 1504 (also referred to as central processing units, or CPUs) that may be coupled to memory devices including primary storage device 1506 (typically a read only memory, or ROM) and primary storage device 1508 (typically a random access memory, or RAM). As is well known in the art, ROM acts to transfer data and instructions uni-directionally to the CPUs 1504, while RAM is used typically to transfer data and instructions in a bi-directional manner. Both the primary storage devices 1506, 1508 may include any suitable computer-readable media. The CPUs 1504 may generally include any number of processors.

A secondary storage medium 1510, which is typically a mass memory device, may also be coupled bi-directionally to CPUs 1504 and provides additional data storage capacity. The mass memory device 1510 is a computer-readable medium that may be used to store programs including computer code, data, and the like. Typically, the mass memory device 1510 is a storage medium such as a hard disk which is generally slower than primary storage devices 1506, 1508.

The CPUs 1504 may also be coupled to one or more input/output devices 1512 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, the CPUs 1504 optionally may be coupled to a computer or telecommunications network, e.g., an internet network or an intranet network, using a network connection as shown generally at 1514. With such a network connection, it is contemplated that the CPUs 1504 might receive information from the network, or might output information to the network in the course of performing the above-described method steps. Such information, which is often represented as a sequence of instructions to be executed using the CPUs 1504, may be received from and outputted to the network, for example, in the form of a computer data signal embodied in a carrier wave.

Although illustrative embodiments and applications of this invention are shown and described herein, many variations and modifications are possible which remain within the concept, scope, and spirit of the invention, and these variations would become clear to those of ordinary skill in the art after perusal of this application. For instance, the present invention is described as being implemented in a Unix system using Solaris doors. However, the present invention may be implemented in a variety of ways. Moreover, the above described process blocks are illustrative only. Therefore, the implementation of the data transport module and HTTP daemon may be performed using alternate process blocks as well as alternate data structures. Accordingly, the present embodiments are to be considered as illustrative and not restrictive, and the invention is not to be limited to the details given herein, but may be modified within the scope and equivalents of the appended claims.

What is claimed is:

1. In a web server, a method of processing a HTTP request including HTTP request data, comprising:

receiving HTTP request data from a client; and sending the HTTP request data and a preempt indicator from a data transport module to a HTTP daemon, the data transport module being responsible for sending the HTTP request data to the HTTP daemon and transmitting a response received from the HTTP daemon, the preempt indicator indicating that processing is to be preempted to the HTTP daemon while the data transport module defers processing when the preempt indicator is in a first state, and the preempt indicator indicating that processing is not to be preempted to the HTTP daemon when the preempt indicator is in a second state.

2. The method as recited in claim 1, further comprising:

setting the preempt indicator to the first state when the HTTP request comprises further request data to send to the HTTP daemon.

3. The method as recited in claim 2, further comprising:

setting a more indicator to indicate that the HTTP request comprises further request data to be sent to the HTTP daemon.

4. The method as recited in claim 1, further comprising:

instantiating an object;

providing the HTTP request data and the preempt indicator in the object; and wherein sending the HTTP request data and the preempt indicator from the data transport module to the HTTP daemon comprises sending the object to the HTTP daemon.

5. The method as recited in claim 4, wherein sending the HTTP request data and the preempt indicator further comprises:

performing a door call with the object as a parameter.

6. In a web server, a method of transporting a HTTP response to a HTTP request, the HTTP response including response data, the method comprising:

obtaining response data associated with the HTTP request; and sending the response data and a preempt indicator from a HTTP daemon to a data transport module, the data transport module being responsible for sending the HTTP request to the HTTP daemon and transmitting the response data received from the HTTP daemon, the preempt indicator indicating that processing is to be preempted from the HTTP daemon to the data transport module while the HTTP daemon defers processing when the preempt indicator is in a first state, and the preempt indicator indicating that processing is not to be preempted to the data transport module when the preempt indicator is in a second state.

7. The method as recited in claim 6, further comprising:

setting the preempt indicator to the first state when the HTTP response comprises further response data to send to the data transport module.

8. The method as recited in claim 7, further comprising:

setting a more indicator to indicate that the HTTP response comprises further response data to be sent to the data transport module.

9. The method as recited in claim 6, further comprising:

instantiating an object;

providing the HTTP response data and the preempt indicator in the object; and wherein sending the HTTP response data and the preempt indicator from the HTTP daemon to the data transport module comprises sending the object to the data transport module.

10. The method as recited in claim 9, wherein sending the HTTP response data and the preempt indicator further comprises:

performing a door call with the object as a parameter.

11. In a web server, a method of sending a response to a HTTP request, comprising:

receiving the HTTP request by a HTTP daemon;

determining a response to the HTTP request; and sending an identifier associated with the response from the HTTP daemon to a data transport module, the identifier identifying the response to enable the data transport module to independently access the response for transmission to a client.

12. The method as recited in claim 11, further comprising:

instantiating an object;

providing the identifier in the object; and sending the object from the HTTP daemon to the data transport module, thereby enabling the HTTP daemon to communicate the response to the data transport module without transporting the response in the object.

13. The method as recited in claim 11, wherein the identifier identifies a response stored in an in-kernel cache.

14. The method as recited in claim 11, wherein the identifier identifies a response previously returned by the HTTP daemon.

15. The method as recited in claim 11, wherein the identifier identifies a shared memory segment.

16. The method as recited in claim 11, further comprising:

sending a data type identifier associated with the response from the HTTP daemon to the data transport module, the data type identifier specifying a data type of the response.

17. The method as recited in claim 11, further comprising:

sending encapsulation information associated with the response from the HTTP daemon to the data transport module, the encapsulation information indicating whether the response needs to be encapsulated prior to be transmitted to a client.

18. The method as recited in claim 17, the encapsulation information further indicating a method of encapsulation.

19. In a web server, a method of transmitting a response to a HTTP request, comprising:

sending HTTP request data associated with the HTTP request to a HTTP daemon via a first door;

ascertaining a HTTP response associated with the HTTP request; and sending an object identifying the HTTP response from the HTTP daemon to an in-kernel data transport module via a second door, the data transport module being responsible for transmitting the HTTP response data to a client associated with the HTTP request.

20. The method as recited in claim 19, further comprising:

preempting processing from the second door to the first door.

21. The method as recited in claim 20, wherein preempting processing from the second door to the first door is performed to defer processing by the HTTP daemon until resources are available to enable the HTTP daemon to ascertain the HTTP response associated with the HTTP request and send the object identifying the HTTP response from the HTTP daemon to the in-kernel data transport module.

22. The method as recited in claim 19, further comprising:

preempting processing from the first door to the second door.

23. The method as recited in claim 22, wherein preempting processing from the first door to the second door is performed to defer processing by the data transport module until resources are available to enable the data transport module to send remaining HTTP request data associated with the HTTP request to the HTTP daemon.

24. A computer-readable medium for processing a HTTP request including HTTP request data, the computer-readable medium including computer-readable instructions, comprising:

instructions for receiving HTTP request data from a client; and instructions for sending the HTTP request data and a preempt indicator from a data transport module to a HTTP process, the data transport module being responsible for sending the HTTP request data to the HTTP process and transmitting a response received from the HTTP process, the preempt indicator indicating that processing is to be preempted to the HTTP process while the data transport module defers processing when the preempt indicator is in a first state, and the preempt indicator indicating that processing is not to be preempted to the HTTP process when the preempt indicator is in a second state.

25. A web server for transporting a HTTP response to a HTTP request, the HTTP response including response data, the web server comprising:

a processor; and a memory, at least one of the processor and the memory being adapted for obtaining response data associated with the HTTP request; and sending the response data and a preempt indicator from a HTTP process to a data transport module, the data transport module being responsible for sending the HTTP request to the HTTP process and transmitting the response data received from the HTTP process, the preempt indicator indicating that processing is to be preempted from the HTTP process to the data transport module while the HTTP process defers processing when the preempt indicator is in a first state, and the preempt indicator indicating that processing is not to be preempted to the data transport module when the preempt indicator is in a second state.

26. An apparatus for processing a HTTP request including HTTP request data, comprising:

means for receiving HTTP request data from a client; and means for sending the HTTP request data and a preempt indicator from a data transport module to a HTTP daemon, the data transport module being responsible for sending the HTTP request data to the HTTP daemon and transmitting a response received from the HTTP daemon, the preempt indicator indicating that processing is to be preempted to the HTTP daemon while the data transport module defers processing when the preempt indicator is in a first state, and the preempt indicator indicating that processing is not to be preempted to the HTTP daemon when the preempt indicator is in a second state.

* * * * *